United States Patent [19]

Rollenitz et al.

[11] Patent Number: 4,852,535
[45] Date of Patent: Aug. 1, 1989

[54] AUTOMATIC CONTROL METHOD FOR MOVING A FINAL CONTROL ELEMENT

[75] Inventors: Leopold Rollenitz, Kirchstetten; Andreas Krenn, Baden; Harald Schmidt; Otto Freudenschuss, both of Vienna, all of Austria

[73] Assignee: Steyr-Daimler-Puch AG, Vienna, Austria

[21] Appl. No.: 241,960

[22] Filed: Sep. 8, 1988

[30] Foreign Application Priority Data

Oct. 1, 1987 [AT] Austria .................. 2498/87

[51] Int. Cl.⁴ .............................. F02M 39/00
[52] U.S. Cl. ........................ 123/357; 123/494; 73/119 A
[58] Field of Search ........... 123/357, 358, 359, 494; 73/119 A, 119 R

[56] References Cited

U.S. PATENT DOCUMENTS

| | | | |
|---|---|---|---|
| 3,636,933 | 1/1972 | Ohtani | 123/357 |
| 4,387,589 | 6/1983 | Larson | 73/119 A |
| 4,506,545 | 3/1985 | Yamada | 73/119 A |
| 4,559,816 | 12/1985 | Ebert | 73/119 A |
| 4,572,131 | 2/1986 | Hashimoto | 73/119 A |
| 4,596,216 | 6/1986 | Speed | 73/119 A |
| 4,614,111 | 9/1986 | Wolff | 73/119 A |
| 4,665,872 | 5/1987 | Eheim | 123/357 |

FOREIGN PATENT DOCUMENTS

| | | | |
|---|---|---|---|
| 1187064 | 2/1965 | Fed. Rep. of Germany | 123/357 |
| 3011595 | 10/1981 | Fed. Rep. of Germany | . |
| 3204971 | 8/1982 | Fed. Rep. of Germany | 123/357 |
| 3407748 | 9/1985 | Fed. Rep. of Germany | 73/119 A |
| 3221574 | 12/1987 | Fed. Rep. of Germany | 73/119 A |
| 2062253 | 5/1981 | United Kingdom | 123/357 |
| 2062254 | 5/1981 | United Kingdom | 123/357 |
| 2168271 | 9/1986 | United Kingdom | . |

Primary Examiner—Carl Stuart Miller
Attorney, Agent, or Firm—Marmorek, Guttman and Rubenstein

[57] ABSTRACT

In an automatic control method for moving a final control element, a position sensor delivers actual-position signals representing actual positions of the final control element to a computer, in which said actual position signals are compared with stored desired-position data associated with correcting signals for controlling an actuator for moving the final control element. In dependence on any deviation which is detected between said actual-position signals and desired-value data, the computer corrects the correcting signal so as to eliminate said deviation. To permit said desired-value data to be determined by an automatic operation, the final control element is consecutively moved to two reference positions, which are defined by stops and are disposed at or beyond the ends of the control range of the final control element. The actual-position signals associated with said two reference positions are delivered to said computer as reference position signals, which in said computer are combined with those correcting signals which as reference correcting signals are associated with said two reference positions so as to generate a linear desired-position function in which said desired-position data are related to said correcting signals. After each movement of the final control element to a position within the control range, the computer is operated to detect any deviation between the actual-position signal and that of said desired-position data which in accordance with said function is associated with the last correcting signal.

6 Claims, 2 Drawing Sheets

AUTOMATIC CONTROL METHOD FOR MOVING A FINAL CONTROL ELEMENT

BACKGROUND OF THE INVENTION

1. Field of the Invention

This invention relates to an automatic control method for operating an automatic control system for adjusting a final control element, which particularly consists of a rod for actuating the control rods of fuel injection units of internal combustion engines, in which method a position sensor is operated to deliver actual-position signals representing actual positions of the final control element to a computer, which is operated to compare said signals with desired-position data associated with correcting signals delivered to an actuator for moving the final control element and to detect a deviation and is also operated to correct said correcting signal so as to eliminate said deviation.

2. Description of the Prior Art

When it is desired to move the final control element to positions which correspond as exactly as possible to correcting signals, an actuator which is operatively connected to the final control element may be incorporated in a feedback control loop in which the actual position of the final control element are compared with desired-position signal depending on the correcting signal. In that case the exactness of the control will highly depend on the validity of the desired-position data, which are stored in the computer in association with electric correcting signals. The actuator will then move the final control element until the actual-position signal that is delivered by the position sensor agrees with the desired-position signal associated with the correcting signal. In the previous practice said desired-position data are stored as a result of a manual association of specific reference positions of the final control element with predetermined actual-position signals generated by the position sensor so that the automatic control system must be adjusted in a rather time-consuming and difficult adjustment. This need is inconvenient particularly when the automatic control systems have been made in series because even if they have the same basic design a general adjustment will not be sufficiently accurate so that each automatic control systems must individually be adjusted to allow for the different tolerances in the means for operatively connecting the actuator to the final control element. If it is desired to automatically control the fuel injection units of internal combustion engines, where the quantities of fuel to be injected must be exactly controlled, it will not be sufficient to ensure that the coupling elements associated with the control rods of the fuel injection pumps are exactly positioned on the common actuating rod but the position of the actuating rod and the magnitude of the signals delivered by the position sensor must properly be matched for an aquisition of the desired-position data so that the non-productive times in the manufacture of internal combustion engines will be increased as well as the manufacturing costs.

SUMMARY OF THE INVENTION

For this reason it is an object of the invention to eliminate these disadvantages and to provide an automatic control method which is of the kind described first hereinbefore and permits of a low-cost independent adjustment in which the tolerances existing in a given automatic control system can be taken in account so that the final control element of the automatic control system can be adjusted with great accuracy.

In accordance with the invention that object is accomplished in that for the acquisition of a desired-position data the final control element is consecutively moved to two reference positions, which are determined by stops and in which the final control element is disposed at respective limits of and/or outside the control range, actual-value signals representing said two reference positions are delivered to the computer as reference position signals, the computer is then operated to derive from said two reference position signals and the correcting signals associated with said two reference positions a preferably linear desired-position function in which desired-position data are related to correcting signals and which is referred to for the desired-value data to be compared with the actual-value signals when the actuator is operated under the control of the correcting signal to move the final control element within the control range. When the automatic control system is put into operation the actuator will move the final control element to one reference position and the other in succession. When the actuator is in either of said reference positions, the position sensor delivers to the computer actual-position signals representing reference position signals. The computer will then have in storage a distance, which is represented by the difference between the two reference positions, and reference position signals associated with the locations at the end of said distance. These data may then be utilized by the computer to generate a definite desired-value function, by which a desired position is associated with each correcting signal throughout the control range. That function will be specific to the automatic control system concerned and can be checked by the computer whenever this is desired so that the comparison of the actual- and desired-position signals will ensure that the final control element will be automatically controlled with the desired accuracy. The stops which define the reference positions are disposed at or beyond the limits of the control range so that they will not obstruct the displacement of the final control element throughout the control range and can be approached by the final control element at any time. Said stops may consist of separately made stops or of limit stops which may be used also for other purposes. The specific design and the mode of operation of the actuator and of the position sensor are not particularly significant provided that the actuator is adapted to move the final control element into engagement with each stop and the position sensor is adapted to deliver the proper reference position signals.

Within the scope of the invention it will be particularly desirable to store substitute reference position data in the computer and to use said substitute data for the determination of the desired-position function when no measured reference position data are available or when wrong reference position data have been stored. Under certain circumstances the final control element may not be able to move to the reference positions or it may not be possible to store the reference position data, for instance, when sufficient time for presetting is not available. In such cases the computer will derive the desired-position data from the substitute reference position data so that a proper automatic control will always be ensured. The magnitude of said substitute reference position data is suitably selected to lie relieably within the range of the possible desired-position data so that positions lying beyond limits for the control will reliably be prevented.

In order to minimize the presetting work, it is possible within the scope of the invention to operate the computer before the beginning of each automatic control operation so as to test the stored reference data and to control the actuator for a movement of the final control element to the two reference positions only when an error is detected so that the aquisition of new desired-position data will not normally be required and a presetting will be necessary only in exceptional cases, e.g., in case of a failure of the memory associated with the computer.

DETAILED DESCRIPTION OF THE PREFERRED EMBODIMENT

Figure 1:
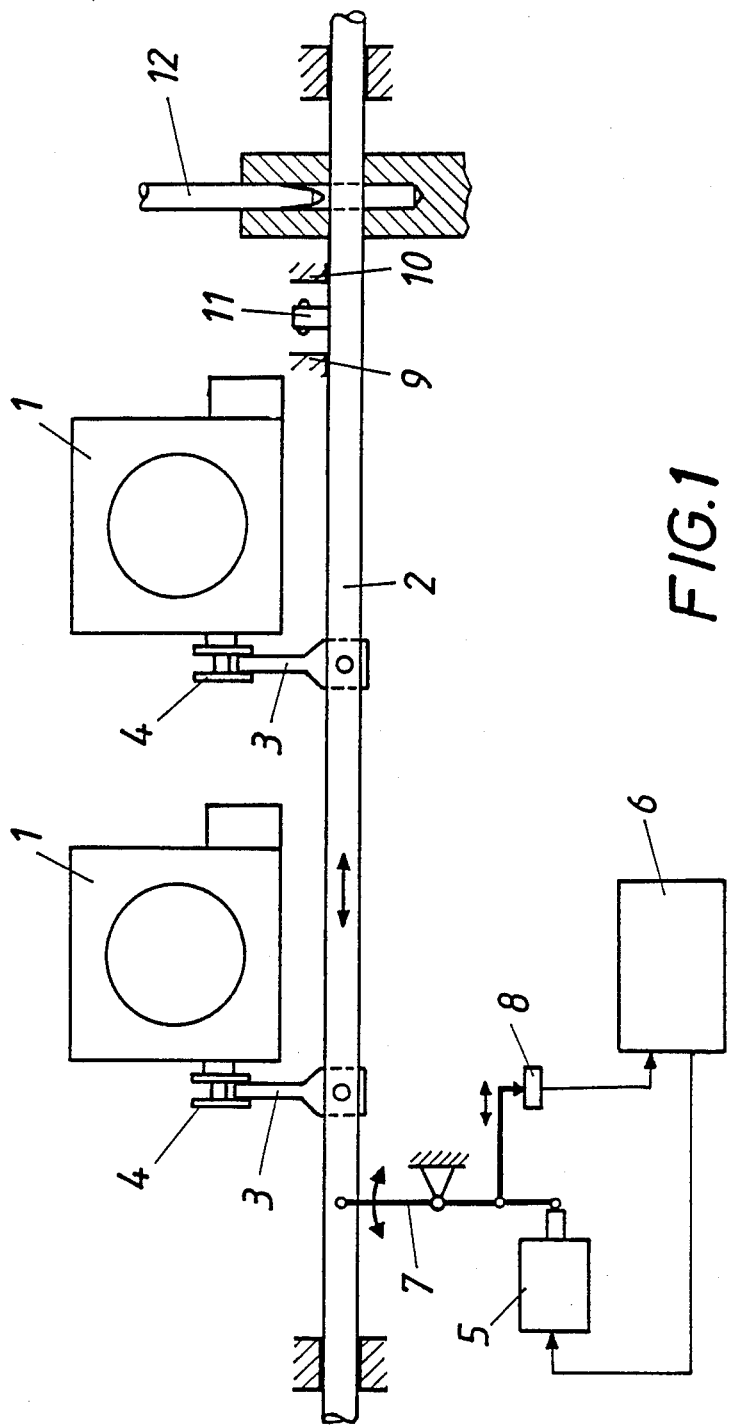
FIG. 1 is a diagram illustrating an automatic control system for controlling fuel injection units of internal combustion engines.

An internal combustion engine for fuel injection comprises fuel injection units 1, which consist each of a fuel injection pump and an injector. The fuel injection pumps are controlled by an actuating rod 2, which by means of coupling elements 3 engages the control rods 4 for controlling the pumps of the units 1 so that said control rods will be adjusted in unison. The actuating rod 2 is longitudinally guided and is longitudinally displaced by an actuator 5, which is controlled by an electric correcting signal from a computer 6 and is operatively connected to the actuating rod 2 by a linkage 2. For the control of the fuel injection units the actuator 2 should be moved over exactly determined distances in response to the correcting signal. In order to comply with this requirement a position sensor 8 is provided, which consists, e.g., of a potentiometer, by which the actual position of the actuating rod 2 is detected directly or from the linkage 7 and corresponding actual-position signals are delivered to the computer 6. In the computer said actual-position signals are compared with stored desired-position data and the computer 6 controls the actuator 5 in dependence on any deviation which has thus been detected.

It is desired to take the inevitable tolerances in the operative connection between the actuator 5 and the actuating rod 2 into account and to ensure that an exact automatic control will be effected. For this reason the desired-position data which are stored in the computer 6 must be specifically acquired for each automatic control system. To permit an automatic individual acquisition of the desired-position data, two stops 9, 10 are provided at respective ends of the normal control range or beyond said ends. That normal control range corresponds to the maximum displacement of the control rods 4. Each of the stops 9, 10 is engageable by a feeler 11, which is mounted on the actuating rod 2 and which will engage the stop 9 or 10 when the actuating rod is in an associated reference position. When the reference position signals corresponding to said reference positions are delivered by the position sensor 8 to the computer 6 and a desired-value function is derived by the computer 6 from said reference position signals and the path length which corresponds to the distance between the two reference positions, the desired-position data which will be available for the comparison with the actual-position signals to determine the deviations from which the correction of the correcting signal will be derived specific for the existing automatic control system and will take all non-linearities, transmission errors and tolereances of that system into account.

For an initial setting of the automatic control system, the actuating rod 2 is fixed in an initial position by means of a transversely inserted locating pin 12 so that the control rods 4 and the coupling elements 3 can properly be located relative to the actuating rod 2. After that initial setting the automatic control system will be automatically operated under the control of the computer so that an exact control of the actuating rod 2 will be ensured.

The reference position data which have been stored in the computer 6 and are used to acquire the desired-position data are acquired when the engine has been manufactured and they can be updated or checked at any time. By a suitable programming of the computer 6 the control operation is performed in dependence on the operating conditions of the motor and substitute reference position data may be stored which permit an acquisition of desired-position data may be stored which permit an acquisition of desired-position data even when measured reference position data are not available. The substitute desired-position data derived from such substitute reference position data will restrict the automatic control to a safety range well within the normal control range. The computer 6 may readily be used also to check the reference position data by itself, e.g., by a check of a control total.

Figure 2:
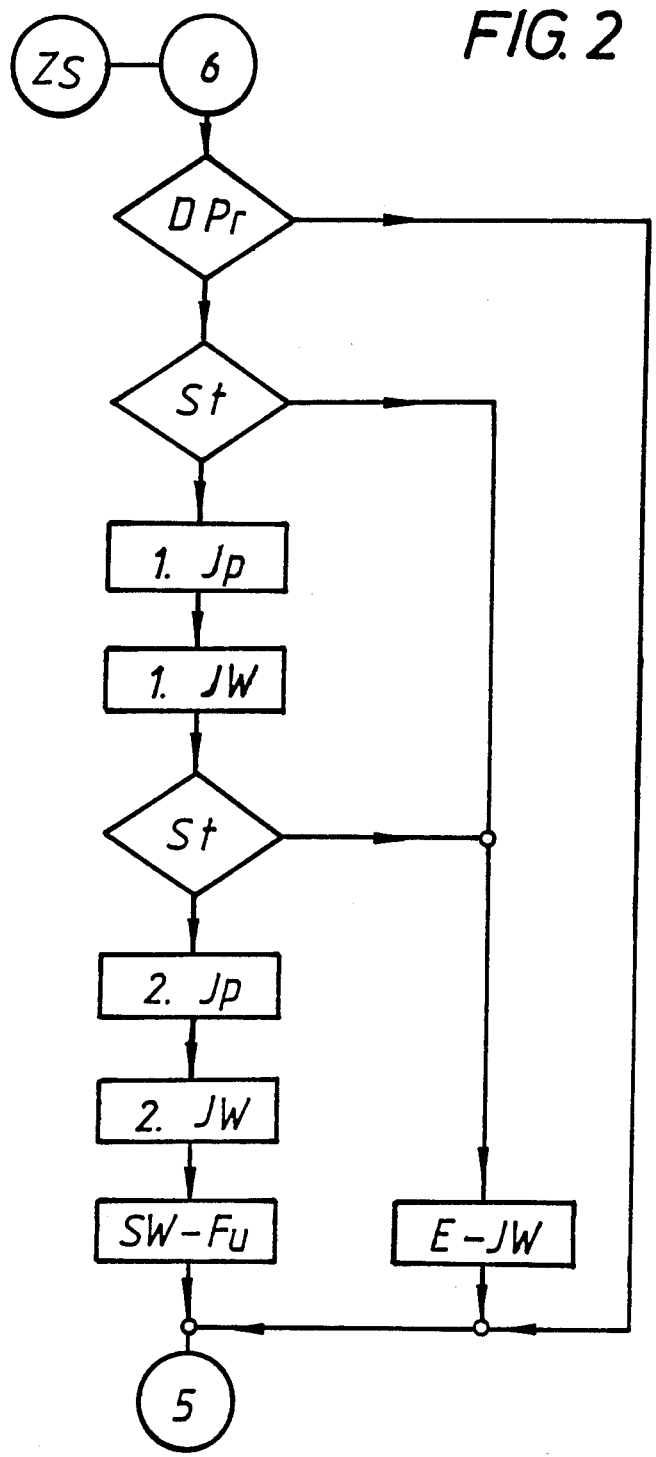
FIG. 2 is a flow scheme which represents the associated automatic control program.

As is indicated in the flow scheme of FIG. 2, a suitable program may result in the following practical operation: In response to the operation of the ignition lock ZS, the computer 6 is turned on before the starter and is thus caused to check the stored data, inclusive of the desired-position data (DN). If the data and particularly the desired-position data are valid, the engine can immediately be automatically controlled via the actuator. When an error has been detected in the stored data, a re-adjustment will be effected but will be interrupted as soon as the engine is started (St). In that case the computer 6 will use the substitute reference position data (E-jw) for the determination of the desired-position data so that the engine will run on the safe side. If there is sufficient time until the engine is started, the final control element 2 is first moved to one reference position (1.Jp) and the first reference position signal (1.JW) is stored. Thereafter the final control element is moved to the second reference position (2.Jp) and the second reference position signal (2.JW) is stored. A start of the engine (St) during that presetting operation will interrupt the storage of the reference position data by the computer 6 and will cause the computer 6 to use the substitute reference position data (E-JW). If the presetting can be performed, the two reference position data will be stored and the new desired-position function (SW-Fu) will be generated. Thereafter the computer 6 can control the actuator 5 with optimum accuracy.

As each operation of the starter results in a checking of data and possibly in a readjustment, a satisfactory and substantially exact automatic control of the fuel injection units will always be ensured even when previously stored desired-position data have been modified by disturbances or have been eliminated.

We claim:

1. In a method of automatically correcting the operation of an automatic control system comprising a final control element and an actuator for receiving a correcting signal and for imparting to said final control element consecutive movements in response to consecutive ones of said correcting signals,
   wherein a position sensor is operated to generate and deliver to said computer an actual position signal corresponding to the actual position of said final control element after each of said movements,
   a plurality of desired-position data corresponding to respective ones of said correcting signals are stored in a computer,
   said computer is operated to compare each of said actual-position signals with that of said stored desired-position data which is associated with the last correcting signal, and
   said computer is operated to correct said correcting signal in dependence on any detected deviation between said actual-position and desired-position signals so as to eliminate such deviation,
   the improvement residing in that
   an automatic control system is used in which said actuator is operable to move said final control element to two spaced apart reference positions, which are defined by stops, and within a predetermined control range extending between said two reference positions,
   said actuator is operated to move said final control element to said two reference positions in succession,
   the correcting signals associated with said two reference positions are stored as reference correcting data in said computer,
   said position sensor is operated to deliver to said computer two reference position signals representing said two reference positions,
   said reference position signals are stored in said computer,
   said computer is operated to generate from said two reference correcting data and said two reference position signals a desired-position function, by which said desired-position data are related to said reference correcting data, and
   said computer is operated after each of said movements of said final control element to detect any deviation of said actual-position signal from that of said desired-position data with in accordance with said function is associated with the last correcting signal.

2. The improvement set forth in claim 1 as applied to the automatic control of fuel injecting units of diesel engines, wherein
   said final control element is adapted to control rods associated with said fuel injection units.

3. The improvement set forth in claim 1, wherein
   two substitute reference position data defining a substitute reference range and two substitute reference correcting signals associated with said substitute reference position data are stored in said computer,
   said computer is operated to generate from said two substitute reference position data and said two substitute reference correcting data a substitute desired-position function by which said desired-position data are related to said substitute reference correcting data, and
   said computer is operated after each movement of said final control element within said substitute reference range detect any deviation of said actual-position signal from that of said desired-position data which in accordance with said substitute desired-position function is associated with the last correcting signal.

4. The improvement set forth in claim 3, wherein said substitute reference range is entirely disposed within said control range.

5. The improvement set forth in claim 1 as applied to an automatic control system in which a computer is used which is operable to perform a test of the validity of said reference position signals, wherein
   said test is performed whenever said automatic control system is put into operation, and
   upon a detection of an invalid reference position signal said system is operated to store two new reference correcting data and two new reference position signals in said computer and to generate a new function by which said desired-position data are related to said new reference correcting data.

6. The improvement set forth in claim 1, wherein said desired-position function is generated by said computer as a linear function.

* * * * *